Figure 5:
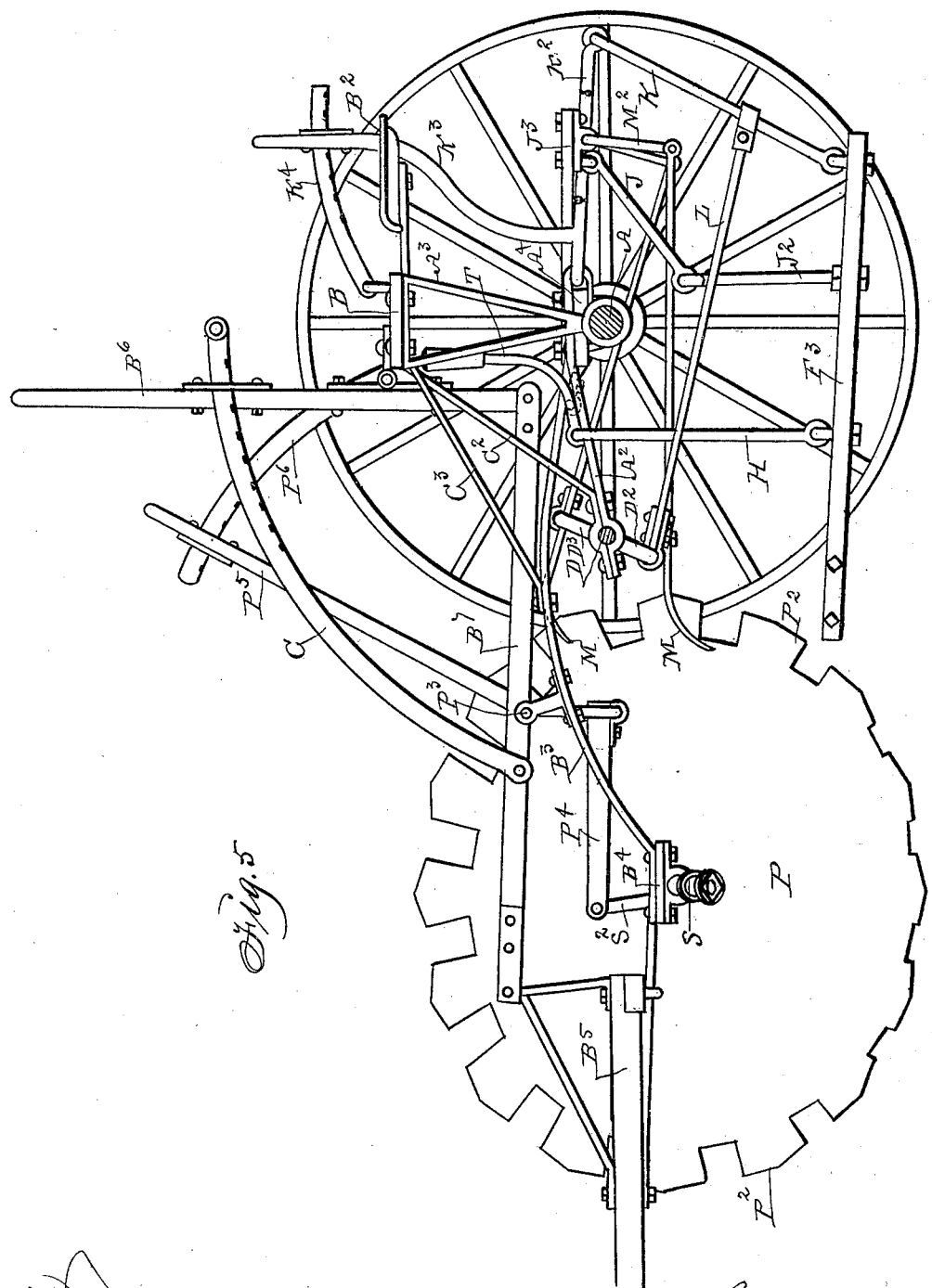

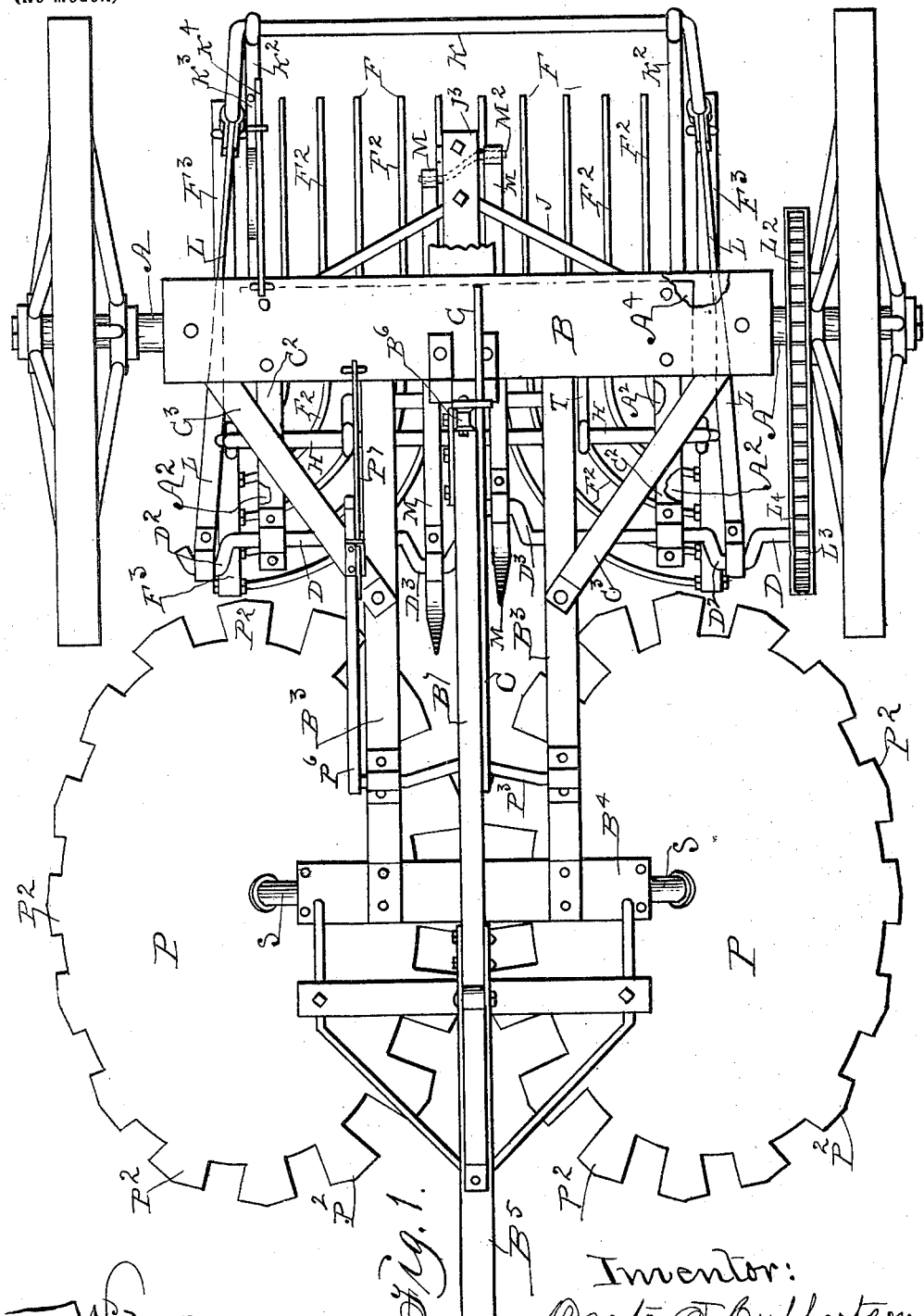

No. 704,519. Patented July 15, 1902.
D. T. CULBERTSON.
POTATO HARVESTER.
(Application filed Apr. 30, 1901.)
(No Model.) 3 Sheets—Sheet 2.
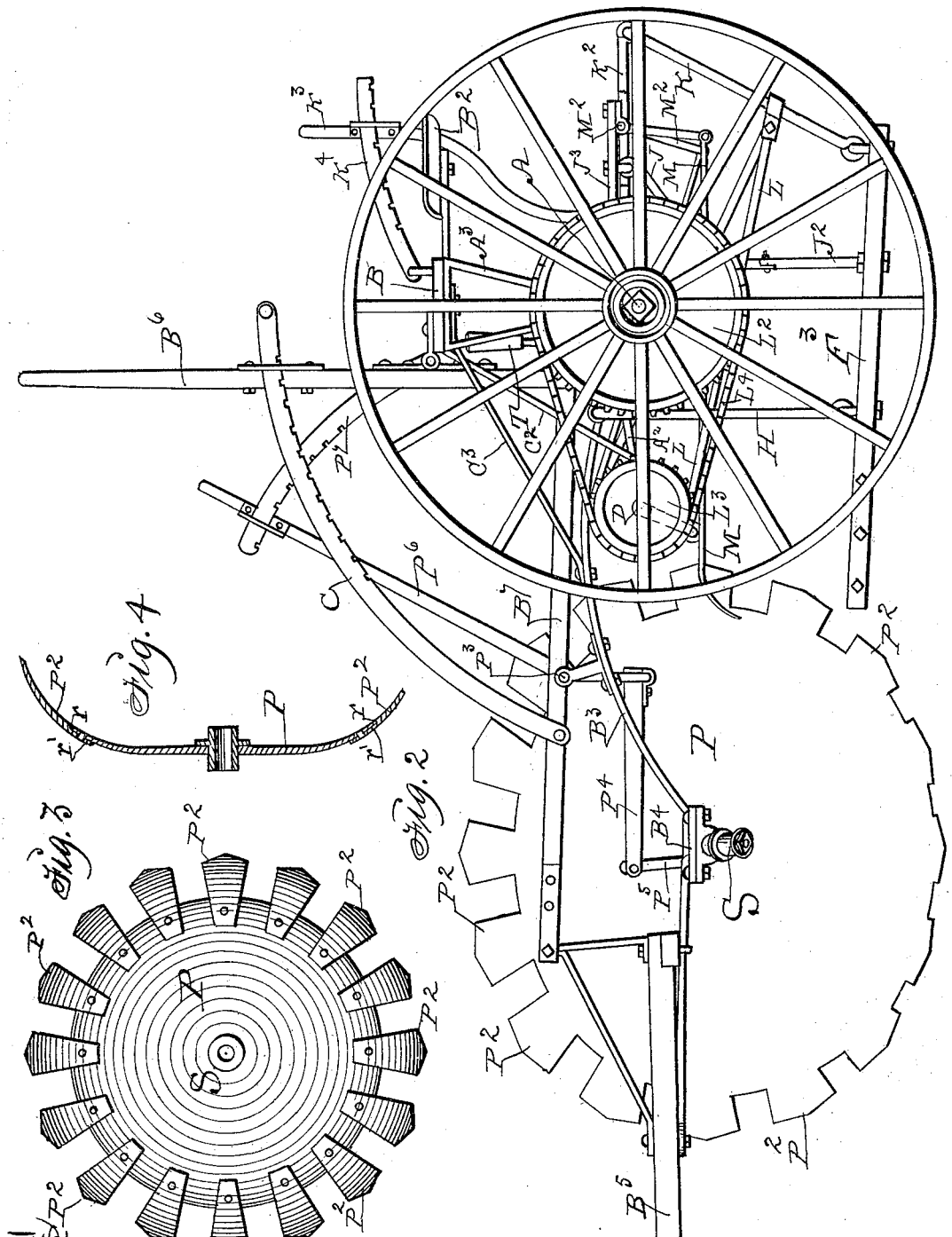

No. 704,519. Patented July 15, 1902.
D. T. CULBERTSON.
POTATO HARVESTER.
(Application filed Apr. 30, 1901.)
(No Model.) 3 Sheets—Sheet 3.

Witnesses: Inventor: Dayton T. Culbertson,
Henry Manger. By Thomas C. Orwig, Attorney.
L. H. Orwig.

UNITED STATES PATENT OFFICE.

DAYTON T. CULBERTSON, OF MILO, IOWA.

POTATO-HARVESTER.

SPECIFICATION forming part of Letters Patent No. 704,519, dated July 15, 1902.

Application filed April 30, 1901. Serial No. 58,177. (No model.)

*To all whom it may concern:*

Be it known that I, DAYTON T. CULBERTSON, a citizen of the United States, residing at Milo, in the county of Warren and State of Iowa, have invented a new and useful Potato-Harvester, of which the following is a specification.

My object is to provide a simple, strong, durable, and efficient potato-harvester that can be constructed at less cost than other efficient machines and operated successfully with less draft force than heretofore required to lift potatoes from under the ground and place them upon the top of the ground as the machine is advanced astride of a row of potatoes in the field.

My invention consists in the construction, arrangement, and combination of rotatable diggers and elevators and reciprocating shakers and carriers with a tractable carriage and mechanism for adjusting them relative to each other, the carriage, and the ground over which they are advanced, as hereinafter set forth, pointed out in my claims, and illustrated in the accompanying drawings, in which—

Figure 1 is a top plan view showing the relative positions of the different operative parts connected with the carriage. Fig. 2 is a side elevation of the machine, from which one of the rotatable diggers is removed. Fig. 3 is a face view of one of the rotatable diggers; and Fig. 4, a transverse sectional view thereof, showing the form of the disk and the manner of fixing cutters to its periphery to project radially and inclined to adapt them to penetrate the soil and get under the potatoes in such a manner that they will lift them as required to place them upon the reciprocating shakers and carriers, that deliver them upon the top of the loose ground in rear of the machine. Fig. 5 is a longitudinal sectional elevation.

The letter A designates the carriage-axle, rotatably mounted upon the parallel side bars $A^2$ of a carriage-frame.

$A^3$ represents mating uprights fixed to the cross-piece $A^4$ of the carriage-frame to support a bench B in an elevated position above the axle A.

$B^2$ is a seat extending rearward from the center of the bench B.

$B^3$ represents the parallel sides of an auxiliary frame, preferably bowed downward, fixed at their rear ends to the cross-piece $A^4$ and rigidly connected at their front ends by a cross-piece $B^4$.

$B^5$ is a pole hinged to the cross-piece $B^4$, and $B^6$ is a hand-lever pivotally connected with the bench B and the pole $B^5$ by means of a bar $B^7$ in such a manner that the pole can be supported in an elevated horizontal position, as required to relieve horses hitched thereto from bearing the weight of the pole when connected with collars on the horses. A rack C, pivoted to the center portion of the bar $B^7$ and adjustably connected with the central part of the lever $B^6$, serves as a means for retaining the pole stationary at different points of elevation relative to the ground and horses of different sizes hitched to the machine at different times.

Braces $C^3$ are fixed to the ends of the bench B and to the side bars $B^3$ of the auxiliary frame, and $C^2$ represents braces fixed to the same bench and the side bars $A^2$ of the carriage-frame to rigidly connect the two frames.

A crank-shaft D is in bearings formed on or fixed to the front ends of the side bars $A^2$ of the carriage-frame. It has mating cranks $D^2$ at its end portions and cranks $D^3$ at its central portion, that project therefrom in reverse ways.

Mating carriers and shakers F are composed of a plurality of rods $F^2$, curved to extend outward at their front ends, and straight bars $F^3$, to which the curved front ends of the rods are fixed. These carriers and shakers are suspended by means of an arched hanger H, that is pivotally connected with the side bars $A^2$ of the carriage-frame and also pivotally connected with the central portion of the straight bars $F^3$, to which the curved rods $F^2$ are fixed. A second arched hanger J is pivotally connected with uprights $J^2$, fixed to the shaker-bars $F^3$, and also pivotally connected with a bar $J^3$, fixed to the center of the cross-piece $A^4$ of the carriage-frame. A third arched frame K is pivotally connected with the rear ends of the shaker-bars $F^3$ and also pivotally connected with a three-sided frame $K^2$, that is hinged to the rear ends of the side bars $A^2$ of the carriage-frame.

$K^3$ is a hand-lever fixed to the frame $K^2$ in such a position relative to the seat B² that a person on the seat can adjust the shakers and carriers F as required to raise and lower them relative to the ground over which they are advanced.

K⁴ is a rack pivotally connected with the bench B and adjustably connected with the lever K³ in such a manner that the lever can be retained locked and the frame K² retained stationary when the suspended shakers and carriers F are vibrated as required to shake ground from potatoes placed thereon by means of the rotatable diggers.

To automatically reciprocate the suspended shakers and carriers F, twisted bars L are pivotally connected with the rear arched hanger K and with the cranks D² of the crank-shaft D, and a sprocket-wheel L³ on the end of the crank-shaft is connected with a larger sprocket-wheel L², fixed on the rotatable carriage-axle A, by means of a chain L⁴ in such a manner that when the machine is advanced the crank-axle will be rotated and by means of rods or twisted bars L the rotary motion will be converted into reciprocating motion, as required to actuate the shakers and carriers.

Rake-bars M, adapted for pulling potato-vines and weeds rearward over the shakers and carriers F, are pivotally connected at their rear ends with a yoke M², that is pivotally connected with the bar J³, that extends rearward from the cross-piece A⁴ of the carriage-frame and pivotally connected at their front and downwardly-projecting pointed ends with the cranks D³ of the shaft D in such a manner that they will be reciprocated simultaneously with the shakers and carriers F, as required to clear away vines and weeds thrown upon the shakers and carriers with ground and potatoes elevated by means of the rotatable diggers. The rotatable diggers P are in the form of disks, that may be cut from plate metal or cast in molds. A plurality of cutters P², made of steel, are wider at their outer ends than at their inner ends, so that when they are fixed to the circumferences of the disks to extend radially the edges of the cutters will be in straight parallel lines and close enough together to prevent potatoes from falling through between them. The ends of the cutters are V-shaped and adapted to cut vines and penetrate the ground readily as they are rotated, so that there will be less resistance than is met by plows or excavators that do not rotate, and consequently less draft force is required for operating the machine. Each cutter P² has a shoulder $r$ and a lip $r'$, projecting over the shoulder and adapted to overlie the circumferential edge of the disk or digger P to facilitate detachably fixing the cutters to the disk by means of screw-bolts and nuts. An axle S is fixed to the cross-piece B⁴ at the front of the carriage and the ends of the axle inclined downward and the diggers P mounted on the inclined ends in such a manner that they will rotate and come close together in the ground, as required to get under the potatoes and to scoop them up and to elevate the ground and potatoes to fall therefrom upon the shakers and carriers F.

S² is an arm projecting vertically from the center of the axle S.

P³ is a crank-shaft in bearings fixed to the side bars B³ of the auxiliary frame.

P⁴ is a straight link pivotally connected with the crank of the shaft P³ and the arm S² of the axle S.

P⁵ is a lever fixed to the shaft P³ and adjustably connected with a rack P⁶, fixed to the bench B. By moving the lever P⁵ forward the inclination of the diggers P will be changed relative to the line of advance and separated wider at their fronts. A reverse motion of the lever will bring the rear portions of the diggers closer together.

T is an elbow-shaped lever fixed to the arched hanger H in such a manner that the shakers and carriers F can be lifted to facilitate turning the machine about at the end of a field and also to aid in cleaning off any ground or other obstruction that may adhere to them while in operation.

The bar B⁷ serves as a reach for connecting the rear portion of the carriage with the axle S, fixed to the cross-piece B⁴, and the pole B⁵ is connected with the bar B⁷ and the cross-bar B⁴, as required, to govern the line of advance of the disks P, mounted on the axle S, and the rear portion of the carriage connected with bar B⁷.

Having thus described the construction, functions, and arrangement and combination of all the elements, the practical operation and utility of my invention will be readily understood by persons familiar with the art to which it pertains, and

What I claim as new, and desire to secure by Letters Patent, is—

1. In a potato-harvester, a rotatable axle, a carriage-frame, traction-wheels fixed to the ends of the axle, arched hangers pivotally connected with the carriage-frame, shakers and carriers composed of curved rods fixed at their front ends to straight bars and pivotally connected with the arched hangers, a crank-shaft at the front of the carriage-frame, rake-bars connected with the crank-shaft for moving vines in a plane above the shakers and carriers and means for simultaneously reciprocating the rake-bars and the suspended shakers and carriers, arranged and combined to operate in the manner set forth for the purposes stated.

2. In a potato-harvester, shakers and carriers composed of a plurality of rods curved at their front ends and the front ends fixed to straight bars, arched hangers pivotally connected with the carriage-frame and also pivotally connected with the straight bars of the shakers and carriers, as shown and described for the purposes stated.

3. In a potato-harvester, shakers and carriers composed of a plurality of rods curved at their front ends and the front ends fixed to straight bars, arched hangers pivotally connected with the carriage-frame and also pivotally connected with the straight bars of the shakers and carriers, and means for imparting reciprocating motion to the shakers and carriers, as shown and described for the purposes stated.

4. In a potato-harvester, a carriage-frame on a rotatable axle, traction-wheels fixed to the ends of the axle, two arched hangers pivotally connected with the carriage-frame, reciprocating shakers and carriers pivotally connected with the said hangers, reciprocating rakes pivotally connected with the carriage, a third arched hanger pivotally connected with a central rear extension of the carriage-frame and also pivotally connected with the rear ends of the reciprocating shakers and carriers, a rotatable crank-shaft at the front end of the carriage-frame and rods connected with cranks on the end portions of said shafts and with said hangers and means for raising and lowering the suspended shakers and carriers, arranged and combined to operate in the manner set forth for the purposes stated.

5. In a potato-harvester, a carriage-frame on a rotatable axle having fixed traction-wheels on its ends, an auxiliary frame extended forward from the main frame and rigidly fixed thereto, a rotatable axle in bearings on the front end of the auxiliary frame, disk-shaped diggers fixed to the ends of said axle, a pole pivotally connected with the front end of the auxiliary frame, a lever fulcrumed to the main frame, a bar pivotally connected with the rear end of the pole and means for retaining the lever stationary, arranged and combined to operate in the manner set forth for the purposes stated.

6. In a potato-harvester, a carriage-frame on a rotatable axle having fixed traction-wheels on its ends, an auxiliary frame extended forward from the main frame and rigidly fixed thereto, a pole pivotally connected with the front end of the auxiliary frame, a lever fulcrumed to the main frame, a bar pivotally connected with the lever and also pivotally connected with the rear end of the pole and means for retaining the lever and pole stationary, an axle in bearings at the front end of the auxiliary frame and rotatable diggers in the form of disks having cutters extending radially from their circumferences on the ends of the axle, arranged and combined to operate in the manner set forth for the purposes stated.

7. A potato-harvester comprising a carriage-frame on a rotatable axle having fixed traction-wheels, reciprocating shakers and carriers suspended under the carriage-frame, reciprocating rakes in a plane above the said shakers and carriers, a crank-shaft at the front of the carriage-frame and connected with the rotatable axle by means of sprocket-wheels and a chain, means for reciprocating the rakes, means for adjusting the shakers and carriers, an auxiliary frame rigidly connected with the carriage-frame to extend forward therefrom, an axle having its ends inclined downward, diggers rotatably mounted on the inclined ends of said axle, a pole pivotally connected with the front end of the auxiliary frame, a lever fulcrumed to the carriage-frame and connected with the pole by means of a bar, all arranged and combined to operate in the manner set forth for the purposes stated.

DAYTON T. CULBERTSON.

Witnesses:
GEO. W. BURGESS,
ED J. BURGESS.